Oct. 16, 1951  H. W. PRICE ET AL  2,571,162
CLUTCH CONTROL MECHANISM
Filed April 8, 1947  2 Sheets-Sheet 1

INVENTORS
HAROLD W. PRICE
EDWARD E. HUPP
BY- H. V. Clayton
ATTORNEY

Oct. 16, 1951                H. W. PRICE ET AL                2,571,162
                            CLUTCH CONTROL MECHANISM
Filed April 8, 1947                                        2 Sheets-Sheet 2

INVENTORS
HAROLD W. PRICE
EDWARD E. HUPP
BY
H. O. Clayton
ATTORNEY

Patented Oct. 16, 1951

2,571,162

UNITED STATES PATENT OFFICE 2,571,162

CLUTCH CONTROL MECHANISM

Harold W. Price, Bradenton, Fla., and Edward E. Hupp, South Bend, Ind., assignors to Bendix Aviation Corporation, South Bend, Ind., a corporation of Delaware Application April 8, 1947, Serial No. 740,158

7 Claims. (Cl. 192—.052)

1

This invention relates in general to power means for operating the friction clutch of an automotive vehicle and in particular to pressure differential operated power means controlled by an operation of the accelerator of the vehicle and by operation of either a vehicle speed responsive governor or the change speed transmission of the vehicle.

One of the principal objects of our invention is to provide a clutch control mechanism including a pressure differential operated motor controlled in part by a transmission, accelerator and governor controlled vacuum cutin valve operable to make possible a clutch disengaging operation of said motor; and by a three-way pressure balanced follow-up valve which is actuated by the accelerator and a pressure differential operated motor.

Another object of our invention is to provide, in the power plant of an automotive vehicle including a friction clutch, a change speed transmission and an accelerator, a vacuum operated clutch control mechanism comprising a single acting motor, said motor being controlled by a three-way follow-up valve which is actuated, through the intermediary of a floating lever, by the accelerator and a pressure differential and spring operated motor.

Yet another object of our invention is to provide power means for operating the friction clutch of an automotive vehicle said power means serving to effect two stages of clutch engaging movement of the driven element of the clutch as it moves into engagement with the driving element of the clutch said two stage operation of the clutch driven element being effected by a throttle opening movement of the accelerator.

A further object of our invention is to provide, in an automotive power plant including a friction clutch and a change speed transmission, a clutch control mechanism including a motor and valve means for controlling the operation of said motor, said valve means comprising an accelerator and motor operated three-way valve and a vaccum cutin three-way valve, the latter valve being operative to insure a clutch engaging operation of said clutch control mechanism after the transmission is established in its high gear setting.

Yet another object of our invention is to provide, in the power plant of an automotive vehicle including a friction clutch, an accelerator and a three speeds forward and reverse transmission, power means for operating the clutch including a pressure differential operated motor operative-

2 ly connected to the clutch, valve means for controlling the operation of said motor including a three-way valve controlled by a vehicle speed responsive governor, the accelerator and the change speed transmission, and further including another three-way valve controlled by the accelerator and a pressure differential operated motor; said power means being operative to disengage the clutch by the release of the accelerator when the transmission is established in any gear except high gear and also operative to disengage the clutch, when the transmission is established in high gear, by an operation of the governor and the accelerator.

Yet another object of the invention is to provide power means for operating the friction clutch of an automotive vehicle said power means including a pressure differential operated motor and a simple and compact valve unit for controlling the operation of said motor, said unit being located remotely from said motor and including a pressure balanced accelerator and motor operated three-way valve, a solenoid and spring operated vacuum cutin valve and means for actuating the three-way valve including a floating lever interconnecting an accelerator actuated member, a part of the valve, and the power element of a pressure differential operated motor.

Other objects of the invention, including the provision of a control valve of relatively few easily assembled and disassembled parts, will appear more fully hereinafter from the following detailed description when taken in connection with the accompanying drawings, wherein a single embodiment of the invention is illustrated.

Figure 1:
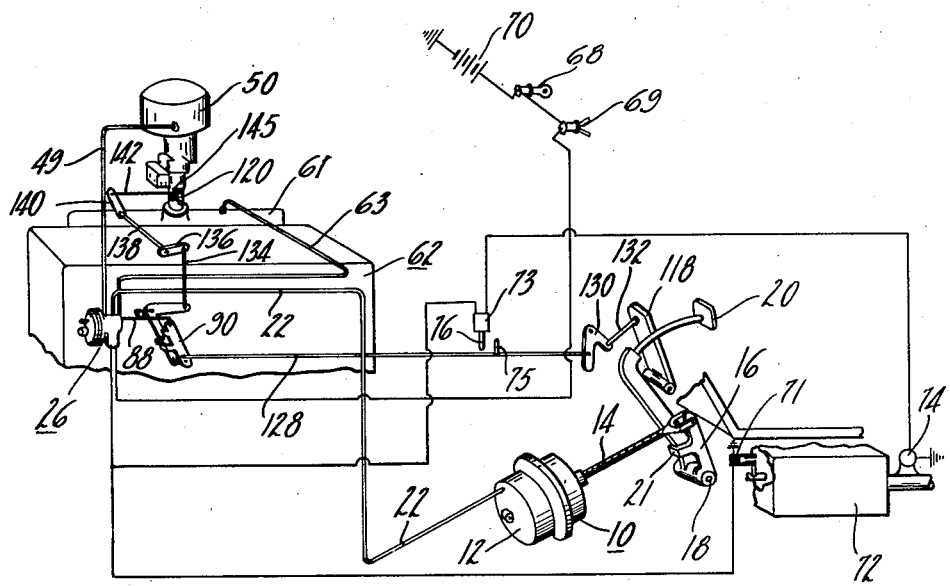
Figure 1 is a diagrammatic view disclosing the principal features of my invention.

Describing now that embodiment of our invention disclosed in the several figures of the drawings the principal elements thereof consist of a single acting vacuum motor 10 comprising a casing 12 and a power element such as a piston, not shown, which is connected to a friction clutch, not shown, of a conventional design. One end of the casing of the motor, a portion of the body thereof and the power element together outline a control chamber, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism.

Figure 3:
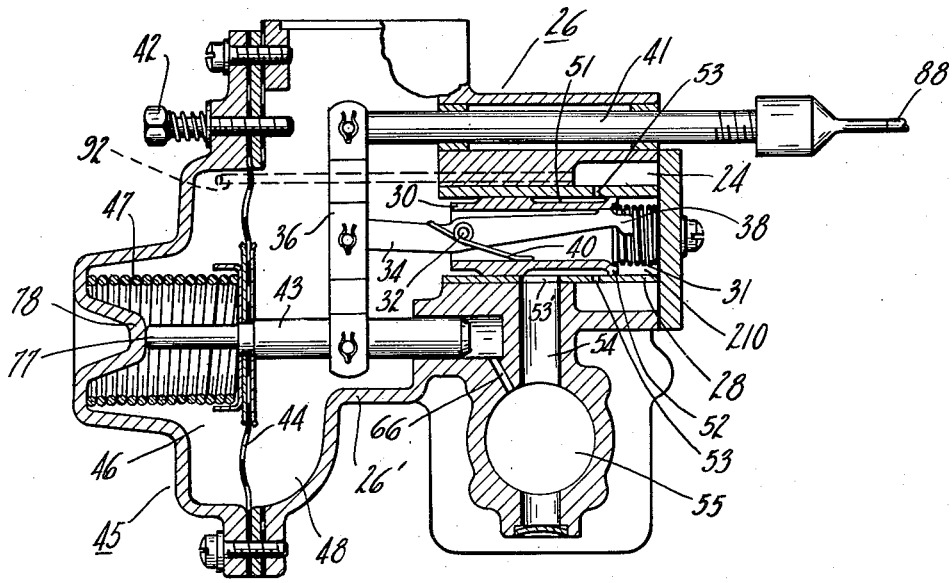
Figure 3 is a longitudinal sectional view taken on the line 3—3 of Figure 2 of the control valve mechanism of my invention.
Figure 2:
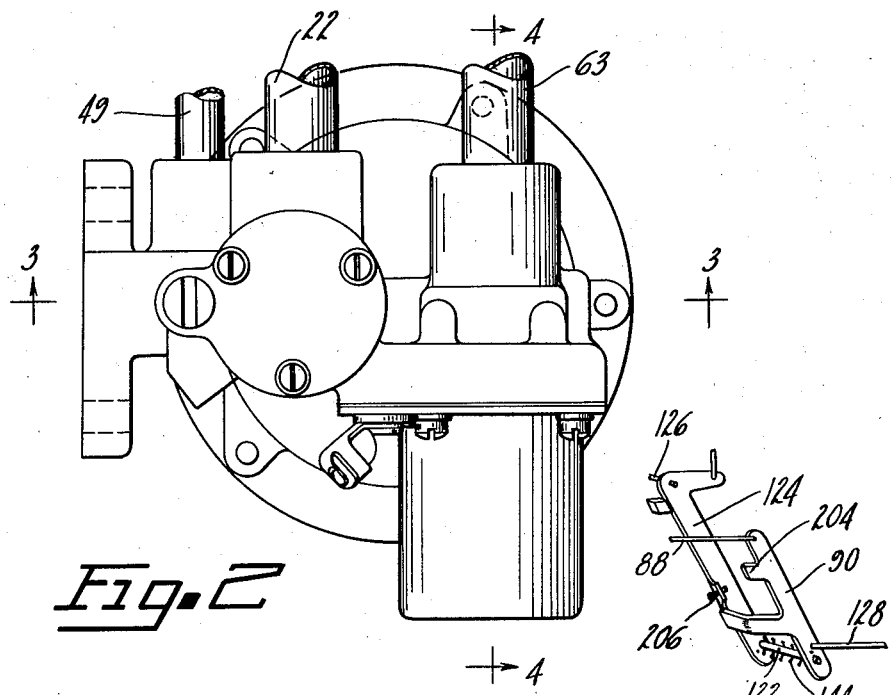
Figure 2 is a plan view looking at one end of the valve mechanism of my invention.
Figure 5:
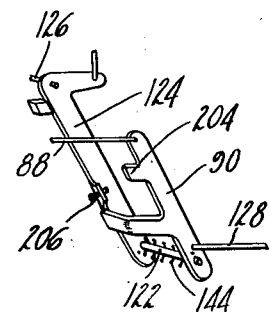
Figure 5 is a view disclosing the principal parts of the connection interconnecting the accelerator, the throttle and the control valve.
Figure 4:
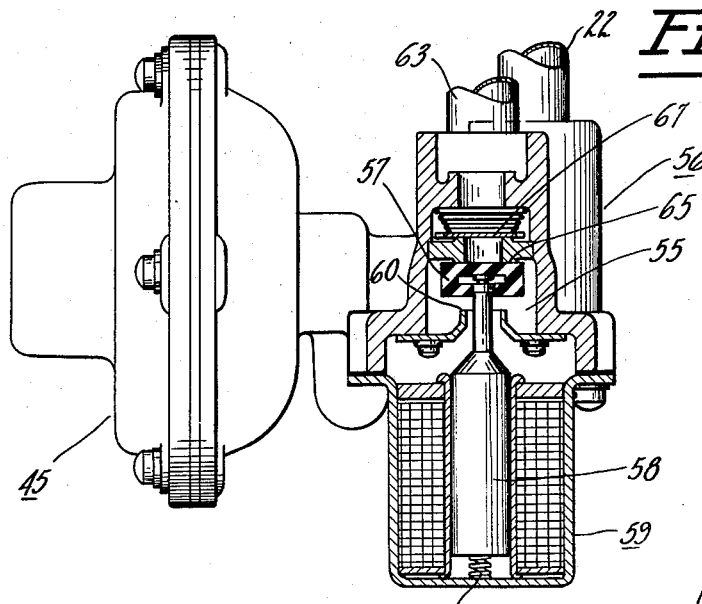
Figure 4 is a view partly in section, taken on the line 4—4 of Figure 2 disclosing details of the solenoid operated vacuum cutin valve of the valve mechanism.

One end of the motor 10, that is the end of the same constituting a part of the aforementioned power compartment of the motor, is connected by a conduit 22 to a compartment 24 of a control valve unit indicated as a whole by the reference numeral 26 and three different views of said unit are disclosed in Figures 2 to 4 inclusive. The casing 26' of the unit 26 is provided with a cylindrically shaped bore to receive a cylindrical sleeve valve member 28 constituting one of the two parts of a three-way valve; and said casing is counterbored to provide the aforementioned compartment 24, Figure 3.

A valve member 30, which is biased inwardly by a spring 31 and which is provided with a cylindrically shaped bore to permit the passage of air therethrough, constitutes the other part of the two part three-way valve. One end of the latter valve member, is provided with diametrically spaced openings to receive therethrough a pin 32 and said pin extends through a connecting pin 34, one end of which extends within the member 30. The other end of the pin 34 extends beyond the valve member 30 and is detachably connected to a two-part lever 36. The end portion 38 of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figure 3, the lever 36 is pivotally connected at one of its ends to a rod 41; and the movement of the rod to the left, Figure 3, is limited by a stop pin 42 adjustably mounted in the valve casing. The other end of the lever 36 is pivotally connected to a pin 43 which is slidably received at one of its ends in a portion of the valve casing and which is secured at its other end to a flexible diaphragm 44. This diaphragm constitutes the power element of a valve operating pressure differential operated motor indicated as a whole by the reference numeral 45; and the operation of said motor is in large measure controlled by the gaseous pressure within the control compartment 46 of said motor, and by a compression spring 47 within said compartment. A compartment 48 of the motor 45 is vented to the atmosphere via a conduit 49 which leads to an air cleaner 50, Figure 2.

The valve member 30 is recessed at 51 and the end of said member provides a land portion 52 which is adapted, in the operation of the valve, to be positioned to register the recess 51 with ports 53 in the valve member 28. The member 30 is also operated so that the land portion 52 covers the ports 53, that is, laps the valve and is also operated to interconnect said ports with the air cleaner 50 via the compartment 48 and the interior of the valve.

The valve member 28 is provided with an opening 53' to register with one end of a duct 54 in the valve casing, said duct registering at its other end with a chamber 55 of a three-way vacuum cutin valve indicated as a whole by the reference numeral 56 and disclosed in detail in Figure 4. The latter valve includes a valve member 57 secured to one end of an armature 58 of a solenoid 59. When the solenoid 59 is energized the valve member 57 moves downwardly, Figure 4, to seat at 60, thereby connecting the duct 54 with the intake manifold 61 of the internal combustion engine 62 of the vehicle via a conduit 63 and the aforementioned chamber 55; and when the solenoid 59 is deenergized, a spring 64 serves to move the armature upwardly, Figure 4, to seat the valve member 57 at 65, thereby cutting off the vacuum connection and venting the duct 54 to the atmosphere via the air cleaner 50, chamber 48 of the motor 45, the recess in the valve casing which houses the outer end of the pin 43, a duct 66 in the valve casing, and the chamber 55. A spring loaded check valve 67 may be included in the vacuum connection between the intake manifold and the valve chamber 55 thereby providing a means for maintaining the clutch disengaged in the event the conduit 63 is broken when the motor 10 is energized.

Completing the description of the valve unit 26 the casing 26' is provided with a duct 92, Figure 3, permanently interconnecting the control compartment 46 of the motor 45 with the aforementioned valve compartment 24. There is thus provided fluid transmitting means for at all times interconnecting the motor compartment 46, the valve compartment 24, and the control compartment of the clutch operating motor 10. It follows therefore that the operation of the clutch control mechanism constituting my invention is controlled by controlling the gaseous pressure within the valve compartment 24.

There is thus provided a compact valve control unit 26 comprising a multi-sectional casing housing a three-way control valve and also housing means for operating said valve comprising a spring and pressure differential operated motor and an accelerator operated pin, said pin and the power element of the motor being connected with the movable part of said valve by means of a floating lever member.

Describing now the force transmitting means interconnecting the accelerator 118 of the car with a throttle operating crank 120 and with the valve operating pin 41, said pin is connected to a rod 88 and this rod is pivotally connected with a lever member 90. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A spring 144, which is weaker than a throttle return spring 145, is operative, together with the spring 145, to return the accelerator to its throttle closed position and to move the valve member 30 to the right, Figure 3, to open the three-way valve, that is operate the same to effect a clutch disengaging operation of the motor 10. The spring 144 is preferably sleeved over the pin 122 and is connected at its ends to the levers 90 and 124. The operation of this part of the mechanism of our invention will be described in greater detail hereinafter when the operation of the entire clutch control mechanism is described in detail.

Describing now an important feature of our invention, the solenoid 59 which operates the vacuum cutin valve 56, is controlled by the electrical controls disclosed in Figure 1. Describing this mechanism a grounded battery 70 is wired in series with an ignition switch 68, a clutch control cutout switch 69 preferably mounted in the instrument panel of the vehicle, the solenoid 59, and a grounded switch 71 which is opened by the second and high gear shift rail of the transmission 72 when the transmission is established in its high gear setting. With this electrical hookup the valve 56 is opened, that is, the valve member 57 is seated at 60, when the switches 68 and 69 are closed and the transmission is established in any gear except high gear; accordingly, with the vacuum cutin valve opened there is provided a source of vacuum to make possible a clutch disengaging operation of the motor 10 when the accelerator is released to open the valve 28, 30 an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic; and to effect this operation of the mechanism of my invention there is provided a switch 73 which is closed when the accelerator is released to close the throttle, and a grounded switch 74 which is operated by a vehicle speed responsive governor, not shown. To effect the operation of the switch 73 there is provided a flange 75 on the rod 128, said flange being contactable with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and it follows, therefore, that the switch 73 is not opened until after the throttle has been opened to a limited degree.

The above described clutch control mechanism of my invention may be incorporated in the power plant of a vehicle which includes a kickdown type of selective gear transmission that is a transmission which may, by manual operation of a shift lever, be established in one or the other of two forward gear settings and a reverse gear setting; and after one of said forward gear settings is established then a pressure differential and spring operated kickdown motor unit, controlled by a vehicle speed responsive governor and the accelerator of the vehicle, takes over the operation of said transmission. In this type of well known transmission mechanism the kickdown or downshift operation of the motor unit is facilitated by a momentary disabling of the ignition system of the engine; and the power plant including such a mechanism may also include a fluid coupling.

Describing now the complete operation of the mechanism constituting our invention and incidentally completing the description of the parts thereof not heretofore described, when the accelerator 118 is released to close the throttle and idle the internal combustion engine 114, the intake manifold 112 of said engine is partially evacuated. There is thus provided a source of vacuum for energizing the motor 10 to disengage the friction clutch of the motor vehicle; and this operation is effected inasmuch as with the release of the accelerator the movable three-way valve member 30 is moved to place said motor in air transmitting connection with the manifold. The valve member 30 and the means for operating the same then assume the relative positions disclosed in Figure 3, the end portion 77 of the pin abutting a stop 78 pressed in from the wall of the valve housing. Air is then withdrawn from the clutch motor and the motor compartment 46 into the intake manifold via the conduit 63, the valve compartment 55, the duct 54 interconnecting the compartment 55 with the port 53', Figure 3, recess 51, ports 53, the compartment 24, the duct 92 interconnecting the compartment 24 with the valve motor compartment 46, and the conduit 22 interconnecting the compartment 24 with the control chamber of the clutch motor 10.

The compartment 46 being then partially evacuated the diaphragm 44 is moved, by the differential of pressures acting on the same, to the position disclosed in Figure 3; for the gaseous pressure within the compartment 46 is at this time the same as that within the intake manifold of the idling engine and this gaseous pressure is of course the same as that within the control compartment of the then energized clutch operating motor 10. It is to be noted that in this clutch disengaged position of the parts the valve member 30 is moved to the left, Figure 3, to a position just short of a closing off of the ports 53 by the flanged end of said valve member, that is, the land 52.

Now it is to be noted that the air transmitting connection with the intake manifold is made possible by virtue of the fact that the valve member 57 of the vacuum cutin valve unit 56 is at the time removed from a seat 65; for the solenoid 59 which actuates said valve member is at the time energized to move the armature 58 and the valve member 57 connected thereto downwardly, Figure 4. Explaining this operation the solenoid 59 is at this time energized by virtue of a closing of the grounded breaker switch 74; for inasmuch as the car is at a standstill the vehicle speed responsive governor, not shown, is then operative to close said switch. The governor is so constructed that when the vehicle is at a standstill or is traveling below a relatively low speed, say ten miles per hour, then the governor is operative to close the grounded switch 74 thus completing an electrical circuit including the switch 74, the then closed accelerator operated switch 73, the solenoid 59, the cutout switch 69, the ignition switch 68 of the vehicle and the grounded battery 70.

It is also to be noted at this juncture that when the valve operating motor 45 is energized the movement to the left, Figure 3, of the diaphragm 44 of said motor not only serves to move the valve member 30 to the position disclosed in said figure but also serves to compress the spring 47; and as will be described hereinafter the degree of compression of said spring, determined by the operation of the power element 44, constitutes a factor in the control of the valve to effect the stage operation of the clutch operating motor.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position.

Continuing now the description of the cycle of operations of the clutch control mechanism the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle spring 145 and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 3, to rotate the lever member 36 about its pivotal connection with the pin 43 as a fulcrum. The valve member 30 is thus moved to the left, Figure 3, the lever 36 operating as a lever of the second class to place the valve ports 53 in communication with a valve chamber 210 which chamber is at all times connected to the atmosphere via the interior of the valve member 30 and the valve compartment 48 which is at all times vented to the atmosphere via the air cleaner 50. It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small.

The valve member 30 having been moved to the left to vent the valve compartment 24 to atmosphere there results a relatively rapid flow of air into both the control compartment of the clutch operating motor 10 and the compartment 46 of the valve operating motor 45; and this flow of air results in a clutch engaging operation of the motor 10. Describing this operation the power element of the motor 10 is moved to the right, Figure 1, by the clutch springs and when said springs have expanded sufficiently to bring the clutch plates just short of engagement with each other, the movement of the power element is arrested.

Explaining this arresting operation the clutch spring, by its expansion, serves to maintain a relatively low gaseous pressure, that is vacuum, within the control chamber of the motor 10. Now inasmuch as said control chamber is at all times connected to the valve chamber 24 and motor chamber 46 it follows that the gaseous pressure within said chambers is also maintained relatively low by virtue of the expansion of the clutch springs. As described above, when the clutch springs have expanded a certain amount, that is, when their vacuum creating pulling power has decreased to a certain factor, then the spring 47 automatically moves to the right, Figure 3, that is, expands, thereby lapping the three-way valve 28, 30. Describing this operation of said valve the valve member 30 moves to the right until the ports 53 register with the land portion 52 of said valve member; and when this occurs the flow of air into the chamber 46 and the motor 10 is automatically cut off and the system is then in equilibrium.

In this operation the lever 90 rotates counterclockwise about the pivotal connection between the pin 122 and said lever, said pivotal connection acting as a fulcrum. As stated above, the parts of the mechanism of our invention are so constructed and arranged, particularly the strength or load of the clutch springs, the area of the diaphragm 44 and the rate of the spring 47, that the valve is lapped to arrest the movement of the power element of the clutch motor when the clutch plates are just short of contact with each other.

This operation of the motor 10 is usually described as the first stage operation thereof and it is to be particularly noted that by varying the rate of the spring 47 that the termination of the first stage operation of the motor may be varied. In other words, by varying the rate of the spring 47 there is provided means for varying the degree of separation of the clutch plates when the first stage of clutch engaging operation of the motor 10 is completed. It is also to be noted that the mechanism of my invention is preferably so constructed that the first stage of clutch engaging operation of said motor is completed before or at substantially the same time as the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completition of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 124 to open the throttle; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the clutch motor compartment 46 and the control compartment of the clutch motor 10 in communication with the atmosphere, thereby increasing the gaseous pressure therein. The clutch springs then automatically resume their expansion to force the clutch plates into contact with each other. As before, if the driver arrests the movement of the accelerator after this resumption of movement of the valve member 30 said member again moves to its lapped position by virtue of a resumption of the expansion of the spring 47. In this valve lapping operation the direction of movement of the valve member 30 is again reversed, the lever 36 fulcruming about its connection with the pin 41. As with the above described first stage of clutch engaging operation of the mechanism the spring 47 expands to move the valve member 30 to its lapped position when the differential of pressure acting on the diaphragm 44 is reduced to a certain factor by the flow of air into the chamber 48. As with the first stage operation of the mechanism, the valve is lapped when the force exerted by the spring 47 equals the force exerted by the diaphragm 44.

The clutch plates are thus first moved just short of engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is the operation to effect the relatively rapid movement of the clutch plates up to a point just short of engagement with each other, will, by virtue of the relatively fast movement of the valve member 30 and its degree of movement during the initial increment of movement of the accelerator, be effected very quickly. The second stage clutch engaging operation of our clutch control mechanism is effected more slowly inasmuch as the bell crank lever 124 is operated as a throttle operating lever of the first class, the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed before or at substantially the same time as the opening movement of the throttle is initiated. The adjustable stop 42 serves to control the mechanism to limit the clutch plate loading factor said factor preferably being such as to prevent a stalling of the engine.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher gear ratio setting.

There is thus provided, by the friction clutch control mechanism of my invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. In this clutch disengaging operation of the power means the accelerator, in its operation of the three-way valve 28, 30, cooperates with the governor in its operation of closing the switch 74 and the accelerator 118 in its operation of closing the switch 73. As to the clutch engaging operation of the power means of my invention, said operation is effected, through the intermediary of the floating lever 36, by an operation of the accelerator and an operation of the valve operating motor 45. It is also to be noted that with the clutch control mechanism of my invention if the driver should fail to depress the accelerator to operate the valve 28, 30 just after the transmission is established in its high gear setting, that the bleed of air into the motor 10 via the duct 66 will nevertheless insure an engagement of the clutch. This operation of the mechanism might be effected if the transmission were placed in its high gear setting just before the vehicle started to descend a grade.

The valve mechanism of my invention which is the most important feature thereof, insures a two stage operation of the clutch motor and a resulting smooth engagement of the clutch, with any mode of operation of the accelerator; for the operation of the leverage changing force transmitting connections and the throttle spring 145 virtually insure this two stage operation of the mechanism when the clutch is engaged as a result of a normal operation of the accelerator. The floating lever 36 interconnecting the reciprocable valve member 30 with the accelerator operated pin 41 and the power element 44 of the valve operating motor 45, provide a very simple, yet effective, means for operating the three-way control valve 28, 30; the varying of the rate of the spring 47 provides a means for determining when the first stage of engagement of the clutch is completed; the particular force transmitting means interconnecting the throttle valve, the valve member 30 and the accelerator 118 insures a completion of the first stage of engagement of the clutch just as the throttle is opened or is about to be opened; and the step by step clutch engaging or disengaging operations of the power element of the clutch motor insures the desired maneuvering of the vehicle in traffic or when the vehicle is being parked.

It is thought that the invention and many of its attendant advantages will be understood from the foregoing description and though said invention has been illustrated in connection with but one modification thereof it will be apparent that various changes may be made in the form, construction and arrangement of the parts without departing from the spirit and scope of the invention or sacrificing all of its material advantages, the form hereinbefore described being merely a preferred embodiment.

We claim:

1. In an automotive vehicle provided with a friction clutch, an accelerator, a change speed transmission and a vehicle speed responsive governor, power means for operating the clutch comprising a switch operated by the accelerator, a switch operated by the transmission, a switch operated by the governor, a pressure differential operated motor operably connected to the clutch and valve mechanism, constituting a single unit, for controlling the operation of said motor said unit including a casing, a pressure differential operated motor within said casing, a lever member pivotally connected to one of the parts of said valve, force transmitting means interconnecting the power element of said latter motor with one end of said lever member, a vacuum cutin three-way valve, a solenoid for operating said cutin valve, and accelerator operated force transmitting means connected with the other end of said lever member, fluid transmitting means interconnecting one compartment of the valve operating motor, a portion of the interior of the casing housing the three-way valve and the clutch operating motor, and electrical wiring interconnecting the aforementioned switches and solenoid, the parts of the clutch operating power means being so constructed and arranged that when the accelerator is released and the accelerator and governor operated switches are closed, said closure resulting in an opening of the cutin valve, then the manifold, by means of the fluid transmitting means and the three-way valve, is connected to both the clutch operating motor and the aforementioned compartment of the valve operating motor to effect a disengagement of the clutch.

2. In an automotive vehicle provided with a throttle valve, a spring biasing said throttle valve to its closed position, an accelerator, and a friction clutch; power means for operating said clutch comprising a single acting vacuum operated motor operably connected to said clutch, a valve for controlling the operation of said motor, and means intreconnecting the accelerator, the throttle valve and the motor controlling valve, said connecting means comprising two lever members of unequal length, a fixed pin upon which one of said levers is mounted, a pin interconnecting one end of the latter lever with one end of the other lever, said latter pin constituting a floating pivotal connection, spring means, weaker than the aforementioned spring, interconnecting said lever members, force transmitting means interconnecting a portion of the shorter of the two levers with the accelerator, force transmitting means interconnecting one end of the shorter lever with the motor controlling valve, and force transmitting means interconnecting one end of the longer of the two levers with the throttle valve, the parts of the aforementioned mechanism being so constructed, arranged and interconnected that there results a relatively rapid opening movement of the motor controlling valve during the first increment of depression of the accelerator and thereafter there results a relatively slow valve opening movement of the latter valve as the throttle opening movement of the accelerator is effected.

3. In an automative vehicle provided with a power plant comprising a friction clutch, a transmission, a vehicle speed responsive governor, an accelerator, and an accelerator operated throttle valve, power means for operating said clutch comprising a single acting pressure differential operated motor operably connected to the clutch, a three-way pressure balanced follow-up valve for controlling the clutch disengaging and clutch engaging operations of said motor, means for actuating the follow-up valve including force transmitting means interconnecting said valve with the accelerator and throttle valve and operative, when the accelerator is depressed, to operate the follow-up valve prior to an opening of the throttle valve, means for controlling the flow of power fluid to and from said valve comprising a solenoid operated vacuum cutin valve, and electrical means for controlling the operation of the latter valve including a breaker switch operated by the governor, a breaker switch operated by the accelerator and a breaker switch operated by the transmission.

4. In an automotive vehicle provided with a friction clutch, a change speed transmission, a vehicle speed responsive governor and a throttle operating accelerator, power means for operating said clutch comprising a pressure differential operated motor having its power element operably connected to the clutch, and valve means, including a governor, accelerator and transmission controlled vacuum cutin valve and further including an eccelerator and motor controlled three-way valve, for controlling the operation of said motor, the parts of said power means being so constructed and arranged and so operative that with an operation of the governor at or below a predetermined car speed with the transmission established in high gear and an operation of the accelerator, there is effected a disengagement of the clutch.

5. In an automotive vehicle provided with a friction clutch and an accelerator, power means for operating said clutch including a pressure differential operated motor, means for controlling the operation of said motor comprising a three-way valve, means for actuating a movable part of said valve comprising a lever member pivotally connected to said movable part, a pressure differential operated motor having its power element pivotally connected to said lever member, a stop member contactable by the lever member and operative as a part of the means for controlling the valve, force transmitting means interconnecting said lever member and accelerator said force transmitting means being so constructed and so proportioned with respect to other parts of the mechanism that the degree of movement of said means is limited by the stop member to thereby limit the degree of movement of the aforementioned movable part of the valve mechanism.

6. In an automotive vehicle provided with an accelerator, a friction clutch, a vehicle speed responsive governor and a three speeds forward and reverse transmission, power means for operating the clutch comprising a pressure differential operated motor operably connected to the clutch, and valve means for controlling the operation of said motor including, as a single unit, a three-way valve, means for operating said valve comprising a spring and pressure differential operated motor, an accelerator operated means, and a floating lever interconnecting said accelerator operated means, a part of the valve, and the power element of the motor; said unit further including a vacuum cutin three-way valve, and means for controlling the operation of the latter valve including a grounded transmission operated switch which is broken when the transmission is established in its high gear setting, a switch closed by the accelerator when the latter is released, and a switch closed by the governor when the vehicle is traveling at a relatively low speed, said latter switch being wired in series with the governor operated switch, said latter switches being wired in parallel with the grounded transmission operated switch.

7. In an automotive vehicle provided with a throttle, an accelerator, a friction clutch, a vehicle speed responsive governor and a change speed transmission, power means for operating the clutch comprising a pressure differential operated motor, means for controlling the operation of said motor including a valve unit comprising a governor, accelerator and transmission controlled vacuum cutin valve, a three-way valve, a pressure differential operated motor constituting a part of means for operating the latter valve, an accelerator operated pin and a lever, said lever interconnecting said pin, the power element of the latter motor and one of the parts of the three-way valve, together with force transmitting means interconnecting the throttle, the accelerator and the aforementioned accelerator operated pin, said force transmitting means including a lever mechanism so constructed and so operative that with a depression of the accelerator, the aforementioned valve part is quickly moved to operate the three-way valve to initiate the clutch engaging operation of the power means, said movement being completed just as the throttle opening movement of the accelerator is initiated.

HAROLD W. PRICE.
EDWARD E. HUPP.

REFERENCES CITED

The following references are of record in the file of this patent:

UNITED STATES PATENTS

| Number | Name | Date |
|---|---|---|
| 2,036,053 | Kliesrath | Mar. 31, 1936 |
| 2,087,305 | Schmitt et al. | July 20, 1937 |
| 2,111,322 | Johnson | Mar. 15, 1938 |
| 2,296,290 | Mayrath | Sept. 22, 1942 |
| 2,317,216 | Paton | Apr. 20, 1943 |
| 2,348,435 | Hey et al. | May 9, 1944 |
| 2,365,470 | Ingres | Dec. 19, 1944 |
| 2,401,681 | Eaton | June 4, 1946 |